Feb. 25, 1941.  R. L. MELTON ET AL  2,233,175
MANUFACTURE OF ABRASIVE COATED ARTICLES
Filed March 28, 1940  2 Sheets-Sheet 1

INVENTORS.
ROMIE L. MELTON
RAYMOND C. BENNER
BY
ATTORNEY.

Feb. 25, 1941.   R. L. MELTON ET AL   2,233,175
MANUFACTURE OF ABRASIVE COATED ARTICLES
Filed March 28, 1940   2 Sheets-Sheet 2
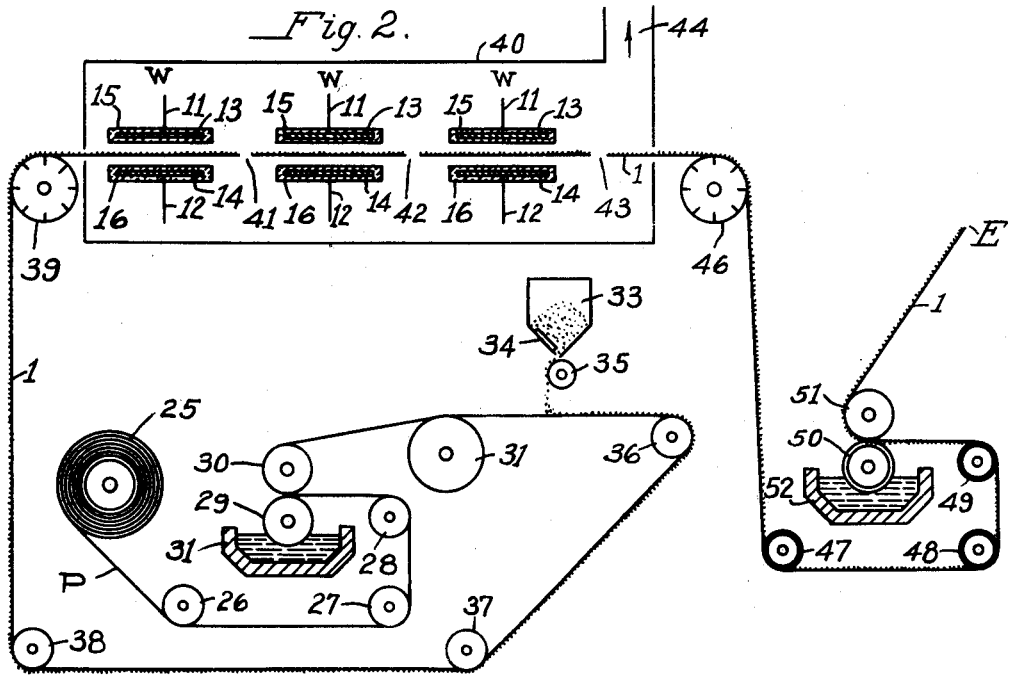
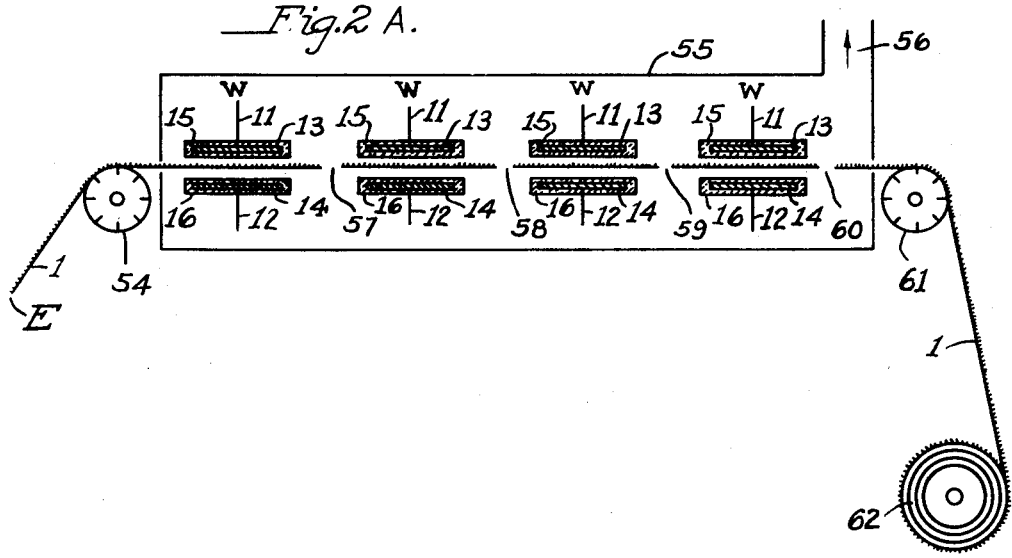
INVENTORS.
ROMIE L. MELTON
RAYMOND C. BENNER
BY
ATTORNEY.

Patented Feb. 25, 1941

2,233,175

UNITED STATES PATENT OFFICE 2,233,175

MANUFACTURE OF ABRASIVE COATED ARTICLES

Romie L. Melton and Raymond C. Benner, Niagara Falls, N. Y., assignors to The Carborundum Company, Niagara Falls, N. Y., a corporation of Delaware Application March 28, 1940, Serial No. 326,452

11 Claims. (Cl. 51—298)

This invention relates to a method of manufacturing granular coated webs, such as that commonly called sandpaper, abrasive discs and other coated abrasive materials. More particularly, this invention relates to the curing or setting of adhesive bonding materials and to a method of curing such products by the use of high frequency alternating current fields. Such high frequency alternating currents are induced directly into each individual granular particle, and to a lesser extent into the adhesive binder itself, to effect a cure of the coated granular article.

In manufacturing abrasive and other granular coated products it has been customary to apply a base coating of adhesive to one side of a web, distribute abrasive grains over the adhesive surface, and then, after a suitable intermediate treatment to set the base adhesive coating, to apply a sizing layer of adhesive over the abrasive grains. After application of the sizing coat of adhesive, the coated web was subjected to further heat treatment to completely set or cure the adhesive. The finished product was then cut up into sheets of suitable sizes and sold.

The use of certain synthetic adhesives, such as phenol formaldehyde resins, alkyd resins, varnishes and thermo-setting resins, has resulted in much longer time curing schedules than formerly required, and also in a tendency of the entire coating to run or crawl during the heat treating operation. These effects have become particularly troublesome in the manufacture of certain coated abrasive articles, generally referred to as abrasive discs, which are usually coated with relatively coarse grain and a comparatively thick coating of a heat hardenable resinous binder. In curing such materials it has been necessary to apply the heat externally and to maintain such external temperature for a rather long time so as to permit the heat to gradually soak through the coated article and effect a thorough cure of the adhesive binder.

Another difficulty involves the dissipation of any volatile materials given off during the curing process, this being particularly troublesome where solvents for the binder are used in conjunction with the bonding agent. When the article is cured by external heat the outer surface of the binder is cured first, and this forms a skin or film through which the volatilized matter from the inner portion must penetrate to escape.

We eliminate the above and many other attendant difficulties of curing such adhesive binders by electrically inducing high frequency alternating currents into the individual abrasive granules, and also to a lesser degree into the adhesive itself. In accordance with the present invention an uncured coated abrasive article is placed within or passed through a high frequency alternating current field whereupon the individual abrasive grains of the coated article, and to a lesser extent the adhesive itself, act as a number of dielectric and/or conducting bodies in each of which high frequency induced currents are set up by reason of the dielectric hysteresis losses, thereby transforming a large amount of the electrical energy into thermal energy. By these high frequency induced currents and the thermal energy developed from them we have found that we can simultaneously heat each individual particle throughout the entire mass of the coated abrasive article so as to heat the mass to a desired temperature in a much shorter time than that which has been possible with methods heretofore used.

In carrying out our invention, we utilize a high frequency electrical oscillating circuit of a conventional design in which the frequency of oscillations may be in the region of from 10 to 50 megacycles. The frequency of the current employed depends, of course, upon the character and size of the abrasive grains and upon the type of the adhesive employed. For example, it has been found by experiment that silicon carbide particles can be heated at a lower frequency than aluminous oxide particles of the same grit size. As the size of the abrasive grain becomes greater it is desirable to decrease the frequency of the current in order to obtain maximum electrical efficiency.

Our invention will be more readily understood by reference to the accompanying drawings in which:

Figure 2 shows a diagrammatic side elevation of one type of apparatus for manufacturing coated webs according to our invention;

Figure 2A shows the remainder of the apparatus partly shown in Figure 2; and

Figure 1:
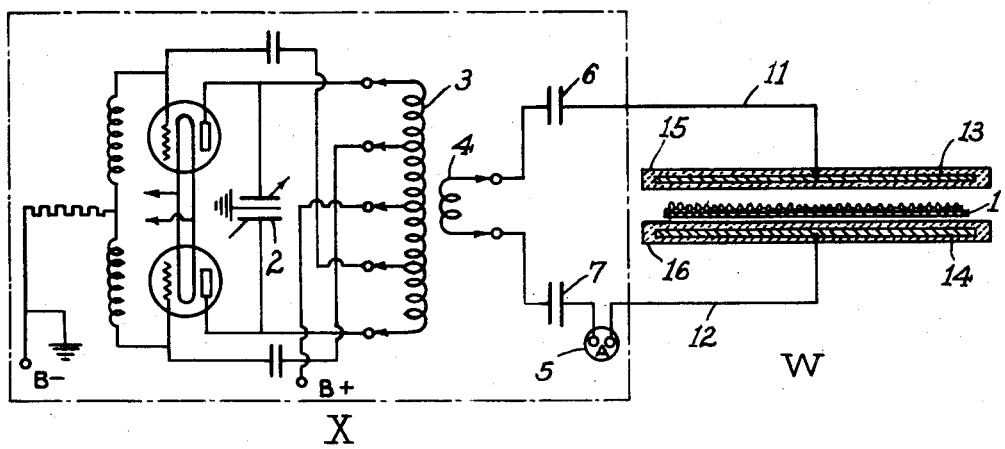
Figure 1 shows diagrammatically a coated abrasive web and high frequency electrical means for heat curing the coated web.

Referring to the illustrated embodiment of the invention, as shown in Figure 1 of the drawings, there is means X for producing an oscillating electrical current of suitable frequency and means W for setting up a high frequency electrical field and supporting a coated abrasive web within said field.

The means X, which provides a source of high frequency electrical power, may be of any conventional design such as used in ultra-high frequency radio work. The circuit shown in Figure 1 is by way of illustration, and is a push-pull Hartley system in which the grid excitation is more constant than in most ultra-high frequency oscillator circuits for various load impedances. This vacuum tube oscillator should be capable of delivering several kilowatts and is tuned through a given frequency range by means of the tuning condenser 2. The coils 3 and 4 are preferably of the plug-in type, and several sets of such coils are provided so that a range of frequencies of from 10 to 50 megacycles, or higher, may be readily obtained. A radio-frequency ammeter 5 is provided in the output circuit and serves to indicate the correct circuit adjustment as well as the current in the output or load circuit. Fixed condensers 6 and 7 have no effect on the performance of the circuit but protect the operator against high direct current voltages in case of an accidental short-circuit within the oscillator X.

The means W for heat-treating a coated abrasive web by a high frequency current comprises power cables 11 and 12, condenser electrodes 13 and 14 and the coated abrasive web 1 to be heated. As a safety precaution for the operator, the condenser electrodes 13 and 14 may be encased in a sheath of electrically insulating material 15 and 16. This insulating sheath should be made of a suitable material, such as Pyrex glass, ceramic material or soft rubber, which has low dielectric losses at the high frequencies employed.

In practising our invention, a web of paper, cloth, vulcanized fiber, combination cloth and fiber, or the like, is coated with a layer of heat hardenable adhesive and abrasive grains and then placed between the plates 13 and 14. An ultra-high frequency current is applied to the condenser plates by the oscillator X and the frequency and intensity of such high frequency currents are adjusted to such values, depending upon the character and size of the abrasive grains and the bonding material, that the layer of grain and adhesive is heated throughout and raised to a temperature sufficiently high to cure the adhesive binder and produce a coated abrasive article. The rate of heating is, of course, determined by the electrical energy supplied to the condenser plates as indicated by the radio frequency ammeter 5. This energy is readily controlled by the tuning condenser 2 and the power input to the oscillating circuit through the plate supply terminals B— and B+. It is desirable that the load circuit be tuned to resonance at all times and the tuning condenser 2 should be adjusted to compensate for any changes in dielectric capacity of the article being cured. The point of resonance is indicated by the ammeter 5 and for maximum electrical efficiency the oscillator should be adjusted so that a maximum reading is obtained on the ammeter.

The adjustment of the oscillator to maintain resonance can be made automatic by suitable automatic tuning means, not shown in the drawings but well known in the radio art. Such a device may comprise a motor drive for the variable condenser 2 and cooperating resonance indicator and electrical contractor or other similar arrangement.

While we have illustrated condenser plates as the preferred means for establishing a high frequency alternating field it is to be understood that a suitable coil may be employed and a high frequency electromagnetic field used to inductively heat the granular particles and adhesive binder. Such a coil or solenoid (not shown in the drawings) should be rectangular in cross section and provisions made for placing or moving the coated abrasive web through the high frequency electromagnetic field produced thereby.

Figures 2 and 2A of the drawings show diagrammatically one type of apparatus for manufacturing abrasive coated webs in continuous sheets. In order to locate this apparatus on one sheet of drawings, it was necessary to show the web 1 broken at the point indicated by the reference character E and to show the remainder of the apparatus below. However, in practice, the points E and E are joined and the path of movement of the web is continuous. The web backing material P, of paper, cloth, fiber, and the like, is fed from the supply roll 25 over the idler rolls 26, 27 and 28 and between the adhesive roll 29 and pressure roll 30. The adhesive roll 29 is caused to revolve in a liquid adhesive contained in the pan 31 by suitable means, not shown, and applies a layer of adhesive to one side of the web. The quantity of adhesive applied to the moving web may be controlled by adjusting the clearance space between the rolls 29 and 30. The adhesive pan 31 is preferably jacketed for a supply of hot water, steam or other heat, in order to maintain the adhesive at the proper temperature.

After the web is coated with a layer of adhesive of proper thickness, it is passed over a supporting roll 31 and into a grain deposition zone where granular particles of a given size are applied. Such granular particles are fed from a hopper 33 through an adjustable feed gate 34 and over a distributing roll 35 and permitted to fall in a shower onto the upwardly facing surface of the adhesively coated web. The coated web is then passed around supporting rolls 36, 37, 38 and suction drum 39 and into a curing zone or chamber 40.

Located within the curing chamber 40 is a series of ultra-high frequency curing means W indicated by the condenser plates 13 and 14. As the granular coated web is moved between these condenser plates, a high frequency current is induced into each individual particle and to a certain extent into the liquid adhesive coating. These induced electrical currents serve to heat the granular particles to a temperature sufficient to drive off any volatile ingredients in the adhesive and to effect a set or cure of the adhesive binder.

The breaks 41, 42 and 43 in the web 1 indicate an appreciable run of paper and suitable spacing between the successive curing means W. Such an arrangement permits heavy currents to be induced into the coated web at periodic intervals, and also permits the heat generated thereby to become distributed through the binder. While a number of spaced apart curing units W are preferred, from an operating point of view, it is to be understood that a single pair of condenser plates of large area can be used if desired.

Volatile materials given off during the curing process are drawn off through an exhaust duct 44.

After the base coating of liquid adhesive has been cured sufficiently to retain the granular particles in position, the coated web is moved out of the chamber 40 over the suction drum 46, rubber covered idler rolls 47, 48 and 49 and between the adhesive roll 50 and pressure roll 51. These adhesive rolls apply a layer of sizing adhesive over the granular coated surface of the web in a manner similar to the application of the base layer of adhesive. The sizing adhesive contained in the pan 52 is generally of a lower viscosity than that used in the base coating.

It may be desirable in certain instances to apply a sizing coating of adhesive in powdered form. In such instances, the liquid applying rolls 50, 51 would be dispensed with, and a suitable granular applying means, such as the granular feed hopper 33, substituted therefor. In this case the base coating of adhesive would not be completely cured prior to application of the powdered adhesive sizing coating, but would only be cured sufficiently to hold the granular particles in place.

After application of the sizing or reinforcing layer of adhesive the coated web is passed over the suction drum 54, into a second curing zone or chamber 55 and between the condenser plates 13, 14 of the high frequency curing means W. Here ultra-high frequency currents are induced into the granular particles, and to a certain extent into the layer of adhesive, and produces sufficient heat to cause a cure or setting of the adhesive. Breaks 57, 58, 59 and 60 indicate a spacing of the curing units W which spacing depends, of course, upon the type of adhesive, grain and coating operation. Any volatilized solvents are drawn off through the exhaust duct 56, and such solvent may be recovered by means of a suitable solvent recovery system.

After the coated web has been cured to the desired degree it is passed out of the curing zone 55, over the suction drum 61 and rolled up into a roll 62. Later this rolled material is cut up into proper sizes and shapes, and sold.

Figure 3:
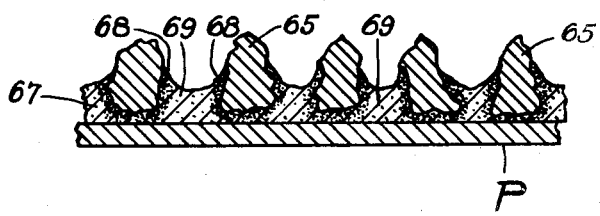
Figure 3 shows a section of an abrasive coated web produced by the present invention.

The method of curing abrasive articles by induced high frequency currents has been found to be of particular value in the manufacture of abrasive coated articles employing heat hardenable adhesives as the binding agent. Since the heat is applied directly into each individual granular particle, the cure of the resin begins at the surface of each particle and any solvent or other volatile matter present in the adhesive binder is more readily driven off, inasmuch as it does not have to penetrate a surface film of partially cured adhesive, as in the case of cures effected by the application of external heat. Furthermore, the cure of such adhesive may be so controlled that the adhesive is more completely cured at the surface of the abrasive granules and less completely cured in the intervening space between adjacent particles. This feature is illustrated in Figure 3 of the drawings which shows an enlarged cross-section of a coated abrasive article. The abrasive grains 65 are attached to the web backing 66 by the adhesive binder indicated generally by the reference character 67. While the coated abrasive article, as a whole, is uniformly cured, it will be noted that the adhesive binder 67, is more completely cured adjacent to the surface of the granules 65, as indicated by the dotted area 68, and progressively less completely cured at increased distances from the grains, as indicated by the sparsely dotted areas 69. This gradation of cure and degree of hardness and/or brittleness of the adhesive is important in that each individual particle is securely held in place by a film of completely cured adhesive while the adhesive binder between the adjacent grains can be less cured and more flexible, thereby providing an abrasive coated material of greatly increased flexibility. Such an article might be likened to a number of grains forming islands of completely cured areas of adhesive surrounded by areas of less completely cured, softer and more flexible adhesive binder.

In addition to curing heat hardenable adhesives, we have also found the present method to be advantageous in setting films of water soluble adhesives, such as glue, sodium silicate and water soluble resins. The presence of water in such adhesives causes an appreciable high frequency current to be produced in the adhesive layer itself and the heat produced in the adhesive layer drives off the water or other volatile solvent. This is in reality an improved drying operation, since the heat produced internally in the adhesive layer causes the volatile materials to be driven off at a much more rapid rate than when subjected to externally applied heat.

Electrically conducting materials, such as metal powders, graphite and similar fillers, may be incorporated in the bonding medium so as to increase the quantity of electrical energy induced into the bond and the heat produced therein. Thus we are able to regulate the relative quantity of heat produced in the granular particles and in the bond itself and thereby control the degree of cure of the bond between the abrasive particles with respect to that in close proximity to said particles. The conducting particles should be appreciably smaller than the abrasive particles used in the mixture and the quantity of such material used will depend upon the particular bond, grain size and desired characteristics of the finished article.

We have also found that the present method of curing adhesives used in the manufacture of abrasive coated articles is of particular importance in curing certain adhesives which soften and become more fluid during the initial stage of the curing operation. This characteristic of some adhesives has heretofore caused certain difficulties in the manufacture of abrasive coated articles, since the softened adhesive film tended to flow down the sides of the paper or cloth web when festooned in drying racks, carrying the abrasive particles along with the adhesive and completely ruining the product. By the present method in which each individual particle is inductively heated, the adhesive is softened only at the surface of each grain and the adhesive filling the space between adjacent grains remains for the time substantially unchanged. As the cure of the resin progresses, it hardens at the surface of each individual grain and gradually cures from each grain outwardly in all directions. Obviously, this eliminates the tendency of such resin films to run or flow from their original position on the coated web.

Other advantages and forms of apparatus will be apparent from the foregoing disclosure to those skilled in the art, and while specific embodiments have been used to illustrate our invention, it is to be understood that the invention is not limited to those embodiments but is defined by the appended claims.

We claim:

1. The method of manufacturing coated abrasive web materials, which comprises applying a layer of liquid heat maturable adhesive to a web, applying a layer of abrasive granules to the adhesive coated web, placing the abrasive coated web in a high frequency alternating current field, and causing high frequency currents to be produced in the individual abrasive granules, whereby said granules are individually heated to a temperature sufficient to mature said adhesive.

2. The method of manufacturing coated abrasive web materials, which comprises applying a layer of liquid heat maturable adhesive to a web, applying a layer of abrasive granules to the adhesive coated web, placing the abrasive coated web in a high frequency alternating current electrostatic field, and causing high frequency currents to be produced in the individual abrasive granules, whereby said granules are individually heated to a temperature sufficient to mature said adhesive.

3. The method of manufacturing coated abrasive web materials, which comprises applying a layer of liquid heat maturable adhesive to a web, applying a layer of abrasive granules to the adhesive coated web, placing the abrasive coated web in a high frequency alternating current electromagnetic field, and causing high frequency alternating currents to be induced into the individual granules, whereby said granules are individually heated to a temperature sufficient to mature said adhesive.

4. The method of manufacturing coated abrasive web materials, which comprises applying a layer of liquid heat maturable adhesive to a web, applying a layer of abrasive granules to the adhesive coated web, placing the abrasive coated web in a high frequency alternating current field, said frequency being of the order of 10 to 50 megacycles, and causing said high frequency currents to be produced in each individual abrasive granule, whereby said granules are individually heated to a temperature sufficient to mature said adhesive.

5. The method of manufacturing coated granular webs, which comprises applying a layer of liquid heat setting adhesive to a moving web, applying a layer of granular particles to the adhesive coated web, moving the granular coated web into a high frequency alternating current field, producing a high frequency current in the individual particles of said granular layer, said high frequency electrical energy being transformed to thermal energy by the dielectric losses within the granules, whereby said granular particles are heated to a temperature sufficient to set said adhesive.

6. The method of setting a solvent liquified adhesive in the manufacture of coated granular webs, which comprises applying a layer of liquid adhesive containing a volatile solvent to a moving web, applying a layer of granular particles to the adhesive coated web, moving the granular coated web into a high frequency alternating current field, causing high frequency alternating currents to be produced in both the individual granular particles and the liquid adhesive, whereby the coated layer is uniformly heated to a temperature sufficient to drive off the volatile solvent and set the adhesive.

7. The method of manufacturing abrasive coated webs, which comprises applying a layer of heat hardenable resinous adhesive to a moving web, applying a layer of abrasive grains to the said adhesive coated web, moving the abrasive coated web into a high frequency alternating current field, and causing high frequency alternating currents to be produced in the individual abrasive grains, whereby said grains and resinous adhesive are heated to a temperature sufficient to cure the said heat hardenable adhesive.

8. The method of manufacturing coated abrasive webs, which comprises applying a layer of liquid heat hardenable adhesive to a moving web, applying a layer of abrasive particles to the adhesive coated web, moving the abrasive coated web through a high frequency alternating current field, causing high frequency currents to be produced in the individual abrasive particles, whereby the abrasive grains are heated and the adhesive matured sufficiently to retain the abrasive particles in position, applying a sizing layer of adhesive to the abrasive coated surface, again moving the coated web through a high frequency alternating current field and again causing high frequency alternating currents to be produced in the individual particles, which high frequency currents act to further heat said particles to a temperature sufficient to fully harden said adhesive.

9. The method of manufacturing coated abrasive web materials, which comprises applying a layer of heat hardenable adhesive to a web, applying a layer of abrasive grains to the adhesive coated surface of said web, moving the abrasive coated web into a high frequency alternating current field, causing high frequency alternating currents to be produced in the individual abrasive grains to electrically heat said grains, and so controlling the said high frequency currents that the adhesive film will be substantially completely cured and relatively rigid at points adjacent to the surfaces of the abrasive grains and progressively less completely cured and more flexible at increasing distances from each individual grain.

10. The method of manufacturing granular coated webs, which comprises applying a layer of heat hardenable adhesive and granular particles to a moving web, passing the granular coated web through a plurality of high frequency alternating current fields, and heating the individual granular particles by means of induced high frequency currents to a temperature sufficient to cure said adhesive.

11. As a new article of manufacture, a granular coated web comprising a web backing material and granular particles adhesively attached thereto, said adhesive being substantially completely cured and relatively rigid at points adjacent to the surfaces of the said granular particles, the remaining portions of the adhesive being in a partially cured and more flexible state.

ROMIE L. MELTON.
RAYMOND C. BENNER.